Patented Nov. 13, 1951

2,574,817

UNITED STATES PATENT OFFICE 2,574,817

CERTAIN RESINS CONTAINING BOTH HYDROXYL AND ALLYL RADICALS, AND METHOD OF MAKING SAME

Melvin De Groote, University City, Mo., assignor to Petrolite Corporation, Ltd., Wilmington, Del., a corporation of Delaware No Drawing. Application August 3, 1950,
Serial No. 177,551

20 Claims. (Cl. 260—52)

The present invention is concerned with the production of certain resins containing both allyl radicals and hydroxyl radicals. Such characteristics give these derivatives peculiar properties, as, for example, the ability to form esters of drying or semi-drying oils, and they can be subsequently employed for manufacture of varnishes or coatings.

Another aspect of the invention is concerned with a method of manufacturing the herein described products.

Such peculiar resins can be used in other ways, as, for example, by blowing the resins or polymerizing them by the use of a peroxide so as to yield the polymerized derivative. The preparation of such derivative is described in my co-pending application Serial No. 177,552, filed August 3, 1950.

Furthermore, such blown or polymerized products can be subjected to oxyalkylation, and particularly oxyethylation, as described in my co-pending application Serial No. 177,553, filed August 3, 1950.

Over and above this, such oxyalkylated derivatives are suitable for the breaking of oil field emulsions, or other emulsions of the water-in-oil type, as described in my co-pending application Serial No. 177,554, filed August 3, 1950.

The allyl-radical containing hydroxylated resins herein described are prepared especially by a four-step procedure.

(1) The preparation of phenol-aldehyde resins of the kind described in detail in U. S. Patent No. 2,499,370, dated March 7, 1950, to De Groote and Keiser, with the following qualification: Said aforementioned patent is limited to resins obtained from difunctional phenols having 4 to 12 carbon atoms in the substituent hydrocarbon radical. For the present purpose the substituent may have as many as 18 carbon atoms, as in the case of resins prepared from tetradecylphenol, substantially para-tetradecylphenol, as sold by the Oronite Chemical Company, San Francisco, California. Similarly, resins can be prepared from hexadecylphenol or octadecylphenol. This feature will be referred to subsequently.

(2) The second step involves treating the phenol-aldehyde resin, so obtained, with an alkylene oxide selected from the class of ethylene oxide, propylene oxide, butylene oxide, glycide and methylglycide in the ratio of at least one and less than two moles of alkylene oxide per phenolic hydroxyl. The preparation of such derivatives is described in De Groote and Wirtel co-pending application Serial No. 99,361, filed June 15, 1949. Said co-pending application illustrates the use of resins in which the hydrocarbon substituent in the ring may have as many as 18 carbon atoms, as previously referred to.

(3) The third step involves tthe hydrogenation of such oxyalkylated resins, i. e., the conversion of the aromatic compounds into the alicyclic analogues. The procedure employed is described in detail in co-pending De Groote and Keiser application Serial No. 64,443, filed December 8, 1948. In said last mentioned co-pending application the phenols employed are selected from the same class referred to in issued U. S. Patent No. 2,499,370, but needless to say, the process is equally applicable in the class of phenols having as many as 18 carbon atoms, in the substituent group, as previously described.

(4) The fourth and final step involves the treatment of the compounds in the presence of an alkaline catalyst with allyl glycidyl ether.

Briefly stated, the present invention is concerned with the process and the products obtained by the following procedure, to wit, the process of (a) reacting a phenol with an aldehyde so as to yield (b) an oxyalkylation-susceptible, fusible, organic solvent-soluble, water-insoluble, phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

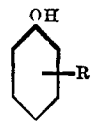

in which R is a hydrocarbon radical having at least 4 and not more than 18 carbon atoms and substituted in the 2,4,6 position; subjecting said aforementioned resin to oxyalkylation with (c) an alpha-beta alkylene oxide having not more than 4 carbon atoms and selected from the class consisting of ethylene oxide, propylene oxide, butylene oxide, glycide and methylglycide; said oxyalkylated resin being characterized by the introduction into the resin molecule of a plurality of divalent radicals having the formula $R_1O$, in which $R_1$ is a member selected from the class consisting of ethylene radicals, propylene radicals, butylene radicals, hydroxypropylene radicals, and hydroxybutylene radicals; with the proviso that from about one-half to less than 2 moles of alkylene oxide be introduced for each phenolic nucleus; (d) converting said oxyalkylated resin into the corresponding alicyclic compound by hydrogenation in presence of a hydrogenating catalyst; and (e) reacting said hydroaromatic compound with allyl glycidyl ether, with the proviso that at least 2 moles of allyl glycidyl ether be reacted for each alicyclic molecule and not in excess of thrice the number of hydroxyl radicals present in said molecule.

For purpose of convenience and also for ease of comparison with the aforementioned patent, or aforementioned co-pending application, what is said hereinafter will be divided into four parts:

Part 1 will be concerned with the preparation of the resins;

Part 2 will be concerned with the oxyalkylation of the resins;

Part 3 will be concerned with the hydrogenation of the resins; and

Part 4 will be concerned with the reaction of the alicyclic products with allyl glycidyl ether.

PART 1

Reference is made to the following U. S. patents: Nos. 2,499,365; 2,499,366; 2,499,367; 2,499,-368, and 2,499,370, all dated March 7, 1950, to De Groote and Keiser. These patents describe phenolic resins of the kind herein employed as initial materials. For practical purposes, the resins having 4 to 12 carbon atoms are most satisfactory, with the additional $C_{14}$ carbon atom also being very satisfactory. The increased cost of the $C_{16}$ and $C_{18}$ carbon atom phenol renders these raw materials of less importance, at least, at the present time.

For specific description of such resins, reference is made particularly to Patent 2,499,370 and to Examples 1a through 103a of that patent for specific examples of suitable resins.

As previously noted, the hydrocarbon substituent in the phenol may have as many as 18 carbon atoms, as illustrated by tetradecylphenol, hexadecylphenol and octadecylphenol, reference in each instance being to the difunctional phenol, such as the ortho- or para-substituted phenol, or a mixture of the same. Such resins are described also in issued patents, for instance, U. S. Patent No. 2,499,365, dated March 7, 1950, to De Groote and Keiser, such as Example 71a.

PART 2

As has been pointed out previously, suitable resins can be made following the procedures previously described, or, for that matter, can be purchased in the open market. The second step in the overall process involves the use of an alkylene oxide, such as ethylene oxide, propylene oxide and glycide, or methylglycide. The most suitable oxides, from an economical standpoint, are ethylene oxide or propylene oxide. Obviously, the apparatus suitable for oxyethylation is also suitable for oxypropylation and will serve if desired for use with glycide.

I have prepared a large number of resins of the kind described in Part 1, preceding, on a laboratory scale varying from a few hundred grams or less to somewhat larger amounts. Needless to say, they are also prepared regularly on an industrial scale. This same statement applies to the preparation of the oxyalkylated products with which this second part is concerned.

For a number of well known reasons, equipment, whether laboratory size, semi-pilot plant size, pilot plant size, or large scale size, is not as a rule designed for a particular alkylene oxide. Invariably and inevitably, however, and particularly in the case of laboratory equipment, the design is such as to use any of the customarily available alkylene oxides, i. e., ethylene oxide, propylene oxide, butylene oxide, glycide, epichlorohydrin, styrene oxide, etc.

Oxyethylations and oxypropylations are conducted under a wide variety of conditions, not only in regard to presence or absence of catalyst, kind of catalyst previously described, but also in regard to the time of reaction, temperature of reaction, speed of reaction, pressure during reaction, etc. Oxyalkylations can be conducted at temperatures approximating the boiling point of water, or slightly above, as, for example, 115° to 120° C.

Likewise, resins can be oxyalkylated, particularly with ethylene oxide or propylene oxide, using temperatures and pressures which are comparatively high, for instance, temperatures in the neighborhood of 200° C. or in excess thereof, and pressures in the neighborhood of 200 pounds per square inch, or in excess thereof. Such oxyalkylations have been described in aforementioned U. S. Patent No. 2,499,370. Generally speaking, such procedure is employed under conditions where there are more than three points of reaction per molecule, and where the amount of oxide added is comparatively high in ratio to the initial reactant. Such procedure is entirely satisfactory in the particular oxyalkylation step described in the instant part, i. e., Part 2.

However, since the amount of oxide is comparatively small, less than two moles per phenolic hydroxyl present in the resin unit, it is apparent that time is not a factor. In other words, it is just as satisfactory to employ a comparatively low temperature and low pressure, rather than conditions of oxyalkylation previously mentioned, which result in a rapid reaction rate. For this reason, I have employed conditions of the kind involving temperatures of about 95° to 115° C., and pressures of 30 to 40 pounds, or less. If an atmosphere of inert gas, such as nitrogen is present during a reaction, needless to say, the pressures may be somewhat higher.

Such low temperature, low reaction rate oxyalkylations have been described very completely in U. S. Patent No. 2,448,664, to Fife et al., dated September 7, 1948.

As previously indicated, low pressure, low temperature reaction rates may require considerable time, as, for instance, in some of the subsequent examples in the neighborhood of one to two hours. Actually, at 180° to 200° C., such reaction might be conducted in ten minutes or less. In large scale low temperature operations the time might be somewhat longer, for instance, 5 to 8 hours. In any event, the reaction is so comparatively short, that it is of no marked significance, but it is more convenient to use these lower temperatures on a laboratory or semi-pilot plant scale.

I have used conventional equipment with two added automatic features: (a) A solenoid-controlled valve which shuts off the propylene oxide in event that the temperature gets outside a predetermined and set range, for instance, 110° to 120° C., and (b) Another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. For reasons which are obvious in light of what has been said previously, I have not found it necessary to use such automatic controls under the conditions of oxyethylation employed in introducing such small portion of alkylene oxide. Controls could be used, if desired, and certainly would be used in high temperature oxyalkylations.

Thus, in preparing the various examples, I have found it particularly advantageous to use laboratory equipment which is designed to permit continuous oxyalkylation, whether it be oxypropylation or oxyethylation. With certain changes, as will be pointed out hereinafter, the equipment can be used also to permit oxyalkylation involving the use of glycide where no pressure is involved, except the vapor pressure of a solvent, if any, which may have been used as a diluent.

As previously pointed out, the method of using propylene oxide is the same as ethylene oxide. This point is emphasized only for the reason that the apparatus is so designed and constructed as to use either oxide.

The oxyethylation or oxypropylation procedure employed in the preparation of the oxyalkylated derivative has been uniformly the same, particularly in light of the fact that either a continuous automatically-controlled procedure was employed, or else a short non-automatic method is used. Indeed, in this instance, the latter is preferred. In this procedure the autoclave was a conventional autoclave made of stainless steel and having a capacity of approximately one gallon and a working pressure of one thousand pounds gauge pressure. This pressure obviously is far beyond any requirement, as far as ethylene or propylene oxide goes, unless there is a reaction of explosive violence involved, due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge; manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and preferably, coils in addition thereto, with the jacket so arranged that it is suitable for heating with steam or cooling with water and further equipped with electrical heating devices. Such autoclaves are, of course, in essence small-scale replicas of the usual conventional autoclave used in oxyalkylation procedures. In some instances, a larger autoclave was used, i. e., one having a capacity ranging in the neighborhood of 1¾ gallons.

Continuous operation, or substantially continuous operation, was achieved by the use of a separate container to hold the alkylene oxide being employed, particularly ethylene oxide or propylene oxide. The container consists essentially of a laboratory bomb having a capacity of about one-half gallon, or somewhat in excess thereof. In some instances, a larger bomb was used, to wit, one having a capacity of about one gallon. This bomb was equipped, also, with an inlet for charging and an eductor tube going to the bottom of the container so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use. The connections between the bomb and the autoclave were flexible stainless steel hose, or tubing, so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

In using the small amounts of oxide involved in ratio to initial reactant, i. e., the phenol-aldehyde resin, one need not employ the automatic devices unless desired. Autoclaves of the kind described are equipped with automatic controls, which would shut off the ethylene oxide or propylene oxide in event temperature of reaction passes out of the predetermined range, or pressure in the autoclave passes out of the predetermined range. However, in procedure of the kind herein reported, I have done nothing further than to set the inlet open so the oxide was added in approximately two hours and then proceed to let the autoclave run for a total of three hours, to insure completeness of reaction. Pressures in no instance registered more than 30 to 40 pounds and the temperatures varied from 95° to 115° C.

One thing must be borne in mind when operating at these comparatively low temperatures of oxyalkylation. When operating at a comparatively high temperature, for instance, between 150° to 200° C., an unreacted alkylene oxide, such as ethylene or propylene oxide, makes its presence felt in the increase in pressure or the consistency of a high pressure. However, at a low enough temperature, it may happen that the oxide, such as propylene oxide, goes in as a liquid. If so, and if it remains unreacted, there is, of course, an inherent danger and appropriate steps must be taken to safeguard against this possibility; if need be, a sample must be withdrawn and examined for unreacted propylene oxide, or ethylene oxide. One obvious procedure, of course, is to oxypropylate or oxyethylate at a modestly higher temperature, for instance, 140° to 150° C. Obviously, similar precautions are necessary in the case of ethylene oxide, although it is more reactive than propylene oxide.

I have found it comparatively simple to manually control the temperature of reaction by use of cooling water, steam, or electrically heat to raise or lower the temperature. It will be noted that the entire procedure herein involved is much simpler than where low pressure, low temperature, low speed reactants are employed in an effort to bring out the introduction of a comparatively large amount of alkylene oxide. Such procedure is sometimes used, for example, in treating diols or triols with ten to twenty or even thirty times their weight of alkylene oxide.

A word can be included in regard to the use of glycide. This is particularly pertinent, because Part 4 is concerned with a reaction involving allyl glycidyl ether, which reaction is also an oxyalkylation, broadly speaking, and involves a reactant which is comparable to glycide. This is obvious, since glycide is 1-hydroxy-2,3-epoxypropane, and allyl glycidyl ether is 1-allyloxy-2,3-epoxypropane. As previously pointed out, glycide is an alkylene oxide suitable for use in reaction with phenolaldehyde resins. If either glycide or methylglycide is employed, no appreciable pressure is involved and no effort need be made to use equipment with automatic controls.

Indeed, in the use of a number of initial reactants with glycide, the entire equipment was used almost as if it were an ordinary piece of non-pressure laboratory equipment, since such reactions can be so conducted. Due to the high boiling point of glycide, one can readily employ a separable glass resin pot, as described in U. S. Patent No. 2,499,365, dated March 7, 1950, to De Groote et al., and offered for sale by numerous laboratory supply houses. Equipment of this kind has been advertised extensively in current chemical journals.

If such arrangement is used to prepare laboratory-scale duplications, then care should be taken that the heating mantle can be removed rapidly, so as to allow for cooling; or better still, through an added opening at the top of the glass resin pot or comparable vessel should be passed a stainless steel cooling coil so that the pot can be cooled more rapidly than by mere removal of mantle. If a stainless steel coil is introduced, it means that the conventional stirrer of the paddle type is changed to one of the centrifugal type, which causes the fluid or reactants to mix, due to swirling action in the center of the pot. Still better, is the use of a metal laboratory autoclave of the kind previously described above, but in any event, when the initial amount of glycide is added to a resin, for example, in order to convert it into an oxyalkylated derivative, speed of reaction should be controlled by the usual factors, such as (a) the addition of glycide; (b) the elimination of external heat; and (c) the use of cooling, so there is no undue rise in temperature. All the foregoing is merely conventional, but is included, due to the hazard in handling glycide. As to the use of glycide as an oxyalkylating agent, see U. S. Patent No. 2,089,569, dated August 10, 1937, to Orthner et al.

The amount of catalyst used in oxyalkylation may vary from as little as ½% up to 5%. The amount may vary during the oxypropylation period, as exemplified by the addition of the catalyst at the very beginning of the reaction only and with no further addition. Needless to say, there is a comparatively high concentration of catalyst at the beginning of the reaction and a comparatively low concentration at the end; in fact, not infrequently the amount of catalyst at the end will be one-half of 1% sodium methylate, or caustic soda, or less. Catalyst can be added intermittently during the reaction period, provided suitable equipment is available. It is rather difficult to employ such equipment on a laboratory scale, but it can be employed, of course, on a pilot plant scale or larger scale.

In the present situation, since comparatively little of the alkylene oxide was added per phenolic hydroxyl, time of reaction is not apt to be a factor. The amount of alkylene oxide may vary, for example, from one-half mole to less than two moles per phenolic hydroxyl. In other comparable oxyalkylations, as have been described in the literature, the amount of oxide added might be 50 to 100 times this amount. Under such circumstances, it is necessary to speed up the reaction in order to finish the process within a reasonable length of time. In the present case the amount of oxide added was so small that even using a low temperature (95° to 115° C.), and a comparatively low pressure, less than 30 or 40 pounds maximum, the reaction was complete in a very short period of time. As a convenience, I have generally added the oxide over a 3-hour period, since the apparatus was practically automatic. The amount of catalyst used was generally about 1.0% of the initial resin. Somewhat more can be used, or slightly less. If more is used the reaction would, of course, be faster, and if less is used reaction might be a little slower. It is my preference to use a minimum amount of catalyst rather than an excessive amount, for the reason that it is desirable to neutralize the excess alkalinity with hydrochloric acid, for example, or sulfuric acid, or phosphoric acid, and remove the inorganic salt prior to hydrogenation, as described in Part 3 succeeding.

One limitation of small-scale autoclave equipment (a gallon to a 2-gallon autoclave) is the difficulty involved in a suitable automatic device for adding a dry catalyst, such as sodium methylate, during the reaction. This presents no problem on a large scale with larger size equipment, and thus, the same operation conducted in equipment of increased capacity means that all the catalyst need not be added at once, but can be added intermittently in a predetermined amount, based on an hourly rate, or based on the addition of ethylene or propylene oxide. For instance, in a large scale operation involving equipment having about twenty-five times the capacity of the autoclave employed, arrangements were made to introduce better than a gallon of ethylene or propylene oxide (4,000 grams) per hour, along with the introduction of 20 grams of sodium methylate hourly during the operation period. The net result, as far as the final material was concerned, was the same, to wit, a residual alkaline catalyst equivalent to about ½% sodium methylate.

In the following example sodium methylate is used as a catalyst. The resin used was prepared in the manner described by reference to the $a$ examples in Part 1. In practically every instance the resin was re-prepared in a triple amount, i. e., using 3 moles of the phenol as a starting material. In each instance the amount of xylene employed was three times the amount used when only one mole of a phenol was employed, i. e., 300 grams. In all other respects, amount of aldehyde, etc., the procedure was the same, the weight ratios only being different. In the succeeding tables the amount of xylene resin solution is shown by weight; subtracting 300 in each instance gives the weight of the resin. For purpose of calculation, the alkylene oxide added and the original phenol employed in manufacture was used as a basis. This was more convenient than using the weight of resin obtained, because it may vary somewhat from batch to batch. The weight of the resin solution was such as to correspond with the original weight shown in Part 1. This is obvious by mere comparison. Actually, the amount was weighed on a laboratory balance which may have been inaccurate to the extent of ¼% or ½%. This, of course, is immaterial in a procedure of the present type. Similarly, the ethylene oxide and propylene oxide were weighed as closely as possible, but here again the variation could have been off ½% to 1%. 3-gram moles of the phenol were used to provide the resin. The amount of oxides employed are shown in the table. The amount of catalyst (sodium methylate) employed is also shown. In all instances the temperature, as stated, was never higher than 115° C. and generally varied from 100° to 110° C. The pressure was never higher than 40 pounds per square inch, and in all instances, the reaction was complete in three hours.

Oxyethylation or oxypropylation was conducted in the usual manner, first sweeping out the equipment with nitrogen and setting the controls as far as the addition of the oxide was concerned, but ignoring the controls as far as temperature and pressure were concerned. Any adjustment required in the matter of temperature and pressure could be made manually by examination of the gauges a few times during the entire procedure. The next step was to add the ethylene oxide or proylene oxide in such a manner that it was injected in the reaction vessel in somewhere between 2 to 2½ hours, and then permitting the reaction period to extend up to 3 hours so as to be sure all the oxide had combined. A specific example is included following by way of illustration:

*Example 1b*

486 grams of a resin of the kind described in Example 1a of Patent 2,499,370 mixed with 300 grams of xylene, were used as the initial charge. To this there was added about 1% (5 grams) of sodium methylate. These ingredients were placed in the autoclave and the autoclave sealed and the automatic devices adjusted for injecting a comparatively small amount of oxide, 135 grams, in about 2¼ hours. The reaction was continued for a total of 3 hours, however, to be sure it was complete. This is a ratio of one mole of oxide for each initial phenolic hydroxyl involved in resin manufacture. The temperature was approximately 110° C. and the pressure was less than 30 pounds per square inch. The final product was a viscous semi-resinous product being somewhat between a resin and a viscous amber-colored fluid obtained by increased oxyethylation. In such instances where the resins employed were liquids, needless to say, further oxyalkylation was in the direction of reduced viscosity. Some resins which were practically viscous liquids to start with became less viscous or more towards the liquid stage. The color varied from deep red or amber to some darker shades, and in some instances, lighter shades. The residual product was, of course, slightly alkaline.

For the purpose described in the next successive part, each particular sample was neutralized with hydrochloric acid and then the xylene eliminated by vacuum distillation. The resin or tacky resinous liquid, or liquids, so obtained was then dissolved in ethyl alcohol and filtered to remove any inorganic salts. The xylene-free alcohol solution was used for hydrogenation as outlined in Part 3, immediately following.

The following table illustrates a variety of suitably oxyalkylated resins. Such resins can be treated, of course, with glycide in exactly the same manner under the same conditions, with the exception that the autoclave is simply used as a reaction vessel with a condenser and without the use of pressure. However, in handling glycide I prefer to use the glass resin pot in the manner previously described. Glycide reacts very rapidly and the molecular proportions, etc., are within the limits previously specified. The resins are identified in terms of the example numbers of Patent 2,499,370.

| Ex. No. | Ex. No. of Resin | Grs. of Resin Xylene Solution | No. of Gr. Mols. Orig. Phenol Represented by Solution | Grs. ETO Used | Mol. Equivalent | Ratio Mol. Oxide to Phenolic Hydroxyl | Catalyst Employed | Amt. of Catalyst | Max. Temp., °C. | Max. Pres. per sq. in. | Time, in hours |
|---|---|---|---|---|---|---|---|---|---|---|---|
| 1b | 1a | 786 | 3 | 135 | 3 | 1:1 | Sodium methylate | 5 | 95–115 | Up to 40 lbs. | 3 hrs. or less. |
| 2b | 1a | 786 | 3 | 200 | 4½ | 1½:1 | ...do... | 5 | 95–115 | ...do... | Do. |
| 3b | 1a | 786 | 3 | 235 | 5¼ | 1¾:1 | ...do... | 5 | 95–115 | ...do... | Do. |
| 4b | 3a | 828 | 3 | 135 | 3 | 1:1 | ...do... | 6 | 95–115 | ...do... | Do. |
| 5b | 3a | 828 | 3 | 200 | 4½ | 1½:1 | ...do... | 6 | 95–115 | ...do... | Do. |
| 6b | 3a | 828 | 3 | 235 | 5¼ | 1¾:1 | ...do... | 6 | 95–115 | ...do... | Do. |
| 7b | 7a | 870 | 3 | 135 | 3 | 1:1 | ...do... | 6 | 95–115 | ...do... | Do. |
| 8b | 7a | 870 | 3 | 200 | 4½ | 1½:1 | ...do... | 6 | 95–115 | ...do... | Do. |
| 9b | 7a | 870 | 3 | 235 | 5¼ | 1¾:1 | ...do... | 6 | 95–115 | ...do... | Do. |
| 10b | 8a | 954 | 3 | 135 | 3 | 1:1 | ...do... | 7 | 95–115 | ...do... | Do. |
| 11b | 8a | 954 | 3 | 200 | 4½ | 1½:1 | ...do... | 7 | 95–115 | ...do... | Do. |
| 12b | 8a | 954 | 3 | 235 | 5¼ | 1¾:1 | ...do... | 7 | 95–115 | ...do... | Do. |
| 13b | 9a | 846 | 3 | 135 | 3 | 1:1 | ...do... | 6 | 95–115 | ...do... | Do. |
| 14b | 9a | 846 | 3 | 200 | 4½ | 1½:1 | ...do... | 6 | 95–115 | ...do... | Do. |
| 15b | 9a | 846 | 3 | 235 | 5¼ | 1¾:1 | ...do... | 6 | 95–115 | ...do... | Do. |
| 16b | 69a | 1,032 | 3 | 135 | 3 | 1:1 | ...do... | 7 | 95–115 | ...do... | Do. |
| 17b | 69a | 1,032 | 3 | 200 | 4½ | 1½:1 | ...do... | 7 | 95–115 | ...do... | Do. |
| 18b | 69a | 1,032 | 3 | 235 | 5¼ | 1¾:1 | ...do... | 7 | 95–115 | ...do... | Do. |
| 19b | 70a | 996 | 3 | 135 | 3 | 1:1 | ...do... | 6 | 95–115 | ...do... | Do. |
| 20b | 70a | 996 | 3 | 200 | 4½ | 1½:1 | ...do... | 6 | 95–115 | ...do... | Do. |
| 21b | 70a | 996 | 3 | 235 | 5¼ | 1¾:1 | ...do... | 6 | 95–115 | ...do... | Do. |
| 22b | 70a | 1,038 | 3 | 135 | 3 | 1:1 | ...do... | 7 | 95–115 | ...do... | Do. |
| 23b | 70a | 1,038 | 3 | 200 | 4½ | 1½:1 | ...do... | 7 | 95–115 | ...do... | Do. |
| 24b | 70a | 1,038 | 3 | 235 | 5¼ | 1¾:1 | ...do... | 7 | 95–115 | ...do... | Do. |
| 25b | 73a | 1,122 | 3 | 135 | 3 | 1:1 | ...do... | 8 | 95–115 | ...do... | Do. |
| 26b | 73a | 1,122 | 3 | 200 | 4½ | 1½:1 | ...do... | 8 | 95–115 | ...do... | Do. |
| 27b | 73a | 1,122 | 3 | 235 | 5¼ | 1¾:1 | ...do... | 8 | 95–115 | ...do... | Do. |
| 28b | 14a | 810 | 3 | 135 | 3 | 1:1 | ...do... | 5 | 95–115 | ...do... | Do. |
| 29b | 14a | 810 | 3 | 200 | 4½ | 1½:1 | ...do... | 5 | 95–115 | ...do... | Do. |
| 30b | 14a | 810 | 3 | 235 | 5¼ | 1¾:1 | ...do... | 5 | 95–115 | ...do... | Do. |

| Ex. No. | Ex. No. of Resin | Grs. of Resin Xylene Solution | No. of Gr. Mols. Orig. Phenol Represented by Solution | Grs. PRO Used | Mol. Equivalent | Ratio Mol. Oxide to Phenolic Hydroxyl | Catalyst Employed | Amt. of Catalyst | Max. Temp., °C. | Max. Pres. per sq. in. | Time, in hours |
|---|---|---|---|---|---|---|---|---|---|---|---|
| 31b | 1a | 786 | 3 | 175 | 3 | 1:1 | Sodium Methylate | 5 | 95-115 | Up to 40 lbs. | 3 hr. or less |
| 32b | 1a | 786 | 3 | 260 | 4½ | 1½:1 | ...do... | 5 | 95-115 | ...do... | Do. |
| 33b | 1a | 786 | 3 | 305 | 5¼ | 1¾:1 | ...do... | 5 | 95-115 | ...do... | Do. |
| 34b | 3a | 828 | 3 | 175 | 3 | 1:1 | ...do... | 6 | 95-115 | ...do... | Do. |
| 35b | 3a | 828 | 3 | 260 | 4½ | 1½:1 | ...do... | 6 | 95-115 | ...do... | Do. |
| 36b | 3a | 828 | 3 | 305 | 5¼ | 1¾:1 | ...do... | 6 | 95-115 | ...do... | Do. |
| 37b | 7a | 870 | 3 | 175 | 3 | 1:1 | ...do... | 6 | 95-115 | ...do... | Do. |
| 38b | 7a | 870 | 3 | 260 | 4½ | 1½:1 | ...do... | 6 | 95-115 | ...do... | Do. |
| 39b | 7a | 870 | 3 | 305 | 5¼ | 1¾:1 | ...do... | 6 | 95-115 | ...do... | Do. |
| 40b | 8a | 954 | 3 | 175 | 3 | 1:1 | ...do... | 7 | 95-115 | ...do... | Do. |
| 41b | 8a | 954 | 3 | 260 | 4½ | 1½:1 | ...do... | 7 | 95-115 | ...do... | Do. |
| 42b | 8a | 954 | 3 | 305 | 5¼ | 1¾:1 | ...do... | 7 | 95-115 | ...do... | Do. |
| 43b | 72a | 1,038 | 3 | 175 | 3 | 1:1 | ...do... | 7 | 95-115 | ...do... | Do. |
| 44b | 72a | 1,038 | 3 | 260 | 4½ | 1½:1 | ...do... | 7 | 95-115 | ...do... | Do. |
| 45b | 72a | 1,038 | 3 | 305 | 5¼ | 1¾:1 | ...do... | 7 | 95-115 | ...do... | Do. |
| 46b | 73a | 1,122 | 3 | 175 | 3 | 1:1 | ...do... | 8 | 95-115 | ...do... | Do. |
| 47b | 73a | 1,122 | 3 | 260 | 4½ | 1½:1 | ...do... | 8 | 95-115 | ...do... | Do. |
| 48b | 73a | 1,122 | 3 | 305 | 5¼ | 1¾:1 | ...do... | 8 | 95-115 | ...do... | Do. |
| 49b | 14a | 810 | 3 | 175 | 3 | 1:1 | ...do... | 5 | 95-115 | ...do... | Do. |
| 50b | 14a | 810 | 3 | 260 | 4½ | 1½:1 | ...do... | 5 | 95-115 | ...do... | Do. |
| 51b | 14a | 810 | 3 | 305 | 5¼ | 1¾:1 | ...do... | 5 | 95-115 | ...do... | Do. |
| 52b | 24a | 1,062 | 3 | 175 | 3 | 1:1 | ...do... | 7 | 95-115 | ...do... | Do. |
| 53b | 24a | 1,062 | 3 | 260 | 4½ | 1½:1 | ...do... | 7 | 95-115 | ...do... | Do. |
| 54b | 24a | 1,062 | 3 | 305 | 5¼ | 1¾:1 | ...do... | 7 | 95-115 | ...do... | Do. |
| 55b | 34a | 843 | 3 | 175 | 3 | 1:1 | ...do... | 5 | 95-115 | ...do... | Do. |
| 56b | 34a | 843 | 3 | 260 | 4½ | 1½:1 | ...do... | 5 | 95-115 | ...do... | Do. |
| 57b | 34a | 843 | 3 | 305 | 5¼ | 1¾:1 | ...do... | 5 | 95-115 | ...do... | Do. |
| 58b | 80a | 1,365 | 3 | 175 | 3 | 1:1 | ...do... | 10 | 95-115 | ...do... | Do. |
| 59b | 80a | 1,365 | 3 | 260 | 4½ | 1½:1 | ...do... | 10 | 95-115 | ...do... | Do. |
| 60b | 80a | 1,365 | 3 | 305 | 5¼ | 1¾:1 | ...do... | 10 | 95-115 | ...do... | Do. |

PART 3

Example 1c

The oxyalkylated resin was the one previously identified as Example 1b. This product, as prepared, contained xylene and a small amount of basic catalyst. Enough concentrated hydrochloric acid was added to neutralize the basic catalyst. As previously noted, the xylene was removed by vacuum distillation at a temperature not in excess of 200° C. During the removal of the xylene, the water introduced by the addition of a small amount of hydrochloric acid was also eliminated together with any small excess of hydrochloric acid which may have been present. This residual material was then dissolved in 300 grams of ethyl alcohol, i. e., an amount equal to the xylene originally present. The anhydrous ethyl alcohol solution was allowed to stand for three days and then filtered so as to remove a small amount of precipitate. The amount of solution at this time was substantially the same as at the end of the previous operation, to wit, approximately 921 grams of which 300 grams represented solvent. This was hydrogenated in two substantially equal half portions. Approximately 460 grams of the material described were placed in an autoclave along with 31 grams of Raney nickel. The amount of Raney nickel used in all instances was approximately 10%, by weight, of oxyalkylated reaction calculated on a solvent-free basis.

The apparatus employed was a stirring type super-pressure autoclave manufactured by the American Instrument Co., Silver Spring, Maryland, and described in their catalogue No. 406 as the 4⅜" series. The instrument was, of course, equipped with all the conventional fittings. The stirring speed employed was approximately 450 R. P. M. The following table shows the time required to hydrogenate. The initial time period shows the starting period in the morning and the second and third columns show the gauge pressure in pounds per square inch and the temperature in degrees centigrade:

| Time | Pressure | Temperature, °C. | Time | Pressure | Temperature, °C. |
|---|---|---|---|---|---|
| 8:00 | 1,270 | 15 | 10:19 | 1,780 | 170 |
| 8:19 | 1,350 | 30 | 10:30 | 1,820 | 180 |
| 8:22 | 1,380 | 40 | 10:37 | 1,820 | 180 |
| 8:28 | 1,450 | 55 | 11:01 | 1,750 | 165 |
| 8:31 | 1,500 | 70 | 11:27 | 1,740 | 165 |
| 8:35 | 1,550 | 80 | 11:43 | 1,750 | 170 |
| 8:39 | 1,580 | 95 | 11:58 | 1,800 | 175 |
| 8:42 | 1,630 | 100 | 12:07 | 1,830 | 180 |
| 8:47 | 1,660 | 110 | 12:15 | 1,860 | 190 |
| 8:53 | 1,700 | 120 | 12:22 | 1,865 | 205 |
| 8:57 | 1,720 | 130 | 12:30 | 1,850 | 205 |
| 9:01 | 1,750 | 135 | 12:39 | 1,830 | 195 |
| 9:05 | 1,760 | 135 | 12:46 | 1,850 | 210 |
| 9:10 | 1,760 | 140 | 12:55 | 1,870 | 200 |
| 9:16 | 1,770 | 140 | 1:02 | 1,850 | 220 |
| 9:32 | 1,780 | 145 | 1:12 | 1,800 | 230 |
| 9:44 | 1,800 | 150 | 1:20 | 1,750 | 225 |
| 9:48 | 1,820 | 155 | 1:42 | 1,730 | 225 |
| 9:56 | 1,830 | 160 | 2:00 | 1,710 | 220 |
| 10:07 | 1,810 | 160 | 2:16 | 1,700 | 230 |
| 10:14 | 1,800 | 165 | 2:20 | 1,690 | 240 |

The next morning, after standing overnight, the temperature had dropped to 26° C. and the pressure to about 835 pounds. The material was then removed by draining the autoclave and then washing with approximately 400 to 500 grams of anhydrous isopropyl alcohol. The mixture of alcohols was then removed by vacuum distillation at less than 100° C. The hydrogenated product was substantially identical in color as prior to hydrogenation, although there may have been some bleaching effect during the hydrogenation reaction. The solubility of the material was not particularly changed in comparison to the product prior to hydrogenation. The tests for aromatic character, such as decolorization of bromine water, indicated that the product was entirely, or nearly entirely, converted into a hydroaromatic compound.

Similar hydrogenation was conducted in which no alcohol was employed as a solvent, the resin having been added to the autoclave in a powdered form, and in such procedure the temperature of the autoclave was raised to 120° C. before starting to introduce hydrogen. The hydrogen was introduced cautiously, being careful to see that the pressure did not go past 1900 pounds and that the temperature did not get past 235° C. The presence or absence of alcohol did not seem to matter particularly, as it was merely a choice with regard to convenience. Other alcohols can be used, such as methyl, propyl, etc. Such alcohols, of course, do cause some increase in pressure, particularly at the higher operating temperatures.

The same procedure was carried out in regard to all the various oxyalkylated products described in Part 2, preceding. The following table shows the example number correspondence between the oxyethylated non-hydrogenated material and the derivative obtained by hydrogenation, together with the maximum temperature, pressure, and time employed in hydrogenation. In each instance the amount of catalyst employed (Raney nickel) was approximately 10% of the solvent-free powder. In some instances, low molal alcohols were employed as solvents, and in other instances, no solvent was present. Actually, the hydrogenation procedure using Raney nickel and equipment of the kind now available is comparatively simple.

In the matter of hydrogenated phenol-aldehyde resins see U. S. Patents No. 2,072,142 and 2,072,143, both dated March 2, 1937, and both to Ubben.

| Ex. No. of Hydrogenated Derivative | Ex. No. of Oxyalkylated Resin | Max. Temp., °C. | Max. Pres., lbs. per square inch | Time of Hydrogenation, hours |
|---|---|---|---|---|
| 1c | 1b | 240 | 1,870 | 6⅓ |
| 2c | 2b | 250 | 1,830 | 6 |
| 3c | 3b | 260 | 1,790 | 5¾ |
| 4c | 4b | 245 | 1,815 | 6¼ |
| 5c | 5b | 250 | 1,890 | 6¾ |
| 6c | 6b | 260 | 1,835 | 5½ |
| 7c | 7b | 240 | 1,795 | 5½ |
| 8c | 8b | 235 | 1,800 | 6½ |
| 9c | 9b | 230 | 1,730 | 6¾ |
| 10c | 10b | 245 | 1,750 | 5¼ |
| 11c | 11b | 245 | 1,750 | 5½ |
| 12c | 12b | 240 | 1,725 | 7 |
| 13c | 13b | 240 | 1,800 | 6¼ |
| 14c | 14b | 230 | 1,825 | 6½ |
| 15c | 15b | 235 | 1,830 | 7⅔ |
| 16c | 16b | 245 | 1,850 | 7 |
| 17c | 17b | 255 | 1,790 | 6¾ |
| 18c | 18b | 250 | 1,820 | 5¾ |
| 19c | 19b | 260 | 1,890 | 5½ |
| 20c | 20b | 255 | 1,835 | 5¼ |
| 21c | 21b | 245 | 1,820 | 6¼ |
| 22c | 22b | 240 | 1,815 | 7¾ |
| 23c | 23b | 240 | 1,850 | 7 |
| 24c | 24b | 235 | 1,825 | 6½ |
| 25c | 25b | 235 | 1,830 | 8 |
| 26c | 26b | 250 | 1,750 | 7½ |
| 27c | 27b | 255 | 1,765 | 7½ |
| 28c | 28b | 245 | 1,765 | 6¾ |
| 29c | 29b | 240 | 1,780 | 5½ |
| 30c | 30b | 260 | 1,890 | 6 |
| 31c | 31b | 266 | 1,800 | 6¼ |
| 32c | 32b | 235 | 1,805 | 6¼ |
| 33c | 33b | 255 | 1,790 | 7 |
| 34c | 34b | 255 | 1,780 | 7½ |
| 35c | 35b | 240 | 1,725 | 6¾ |
| 36c | 36b | 240 | 1,725 | 6 |
| 37c | 37b | 235 | 1,830 | 5¾ |
| 38c | 38b | 245 | 1,820 | 6½ |
| 39c | 39b | 260 | 1,880 | 6⅓ |
| 40c | 40b | 230 | 1,795 | 7 |
| 41c | 41b | 250 | 1,725 | 7½ |
| 42c | 42b | 240 | 1,800 | 7¾ |
| 43c | 43b | 245 | 1,790 | 5¾ |
| 44c | 44b | 260 | 1,820 | 6½ |
| 45c | 45b | 265 | 1,835 | 5 |
| 46c | 46b | 250 | 1,850 | 5½ |
| 47c | 47b | 255 | 1,815 | 6 |
| 48c | 48b | 240 | 1,790 | 6¾ |
| 49c | 49b | 230 | 1,750 | 6½ |
| 50c | 50b | 260 | 1,890 | 5½ |
| 51c | 51b | 240 | 1,850 | 7½ |
| 52c | 52b | 245 | 1,730 | 7 |
| 53c | 53b | 240 | 1,865 | 6¾ |
| 54c | 54b | 255 | 1,770 | 7⅔ |
| 55c | 55b | 235 | 1,840 | 5 |
| 56c | 56b | 230 | 1,890 | 5¾ |
| 57c | 57b | 255 | 1,755 | 6½ |
| 58c | 58b | 255 | 1,835 | 6¾ |
| 59c | 59b | 240 | 1,860 | 7½ |
| 60c | 60b | 250 | 1,820 | 7¼ |
| 61c | 61b | 250 | 1,850 | 8¼ |
| 62c | 62b | 240 | 1,795 | 8 |

As to change in physical appearance as a result of hydrogenation, attention is directed to what has been said preceding. Hydrogenation in numerous cases does show some bleaching effect.

The hydrogenated product freed from solvent which would be susceptible to reaction with glycidyl allyl ether, was admixed with approximately 300 grams of xylene and approximately 1% of sodium methylate. Needless to say, the alcohol employed as a solvent, and for that matter, the xylene employed in Part 1 as a solvent, could be replaced by a solvent which would not be objectionable either from a standpoint of hydrogenation or oxyalkylation, as, for example, decalin. Again, as has been pointed out, all the reactions involved can be conducted in absence of any solvent. This is purely a matter of convenience.

In noting the size of the batch subjected to reaction with allyl glycidyl ether, no account is taken for increase in weight, due to hydrogenation, for the reason that this is a comparatively small factor and there have been some losses in filtering and otherwise. Therefore, the figures that appear in the next part, i. e., Part 4, correspond in essence to the figures appearing in Table II, which show the grams of xylene solution, plus the oxide added. Actually, the treatment with allyl glycidyl ether, as previously noted, is an oxyalkylation process and the reaction is conducted in the same manner as previously mentioned and is substantially the same as one would conventionally employ in the use of glycide.

PART 4

As previously indicated, the present part is concerned with the reaction between allyl glycidyl ether and the alicyclic compounds obtained in the manner described in Part 3, immediately preceding. Such alicyclic compounds are polyhydroxylated, having at least three or more hydroxyl radicals per molecule. Generally speaking, the number of hydroxyl radicals, if obtained by the reaction of ethylene oxide or propylene oxide, for example, would run from 3 to 7 or 8, unless the resin, prior to hydrogenation, had been treated in such a manner as to have present a greater number of phenolic hydroxyls, such as a condensation reaction to increase the resin molecule size. Obviously, if glycide or methyl glycide were used, the number of hydroxyl radicals would be substantially larger, for instance, 10, 15, 20, or even more. In any event, the amount of allyl glycidyl ether employed is sufficient to convert at least a plurality of hydroxyl radicals per molecule into the corresponding allyl compound and may be enough to convert all hydroxyls present, or two or three times this molal amount. More allyl glycidyl ether can be employed than corresponds to the molal proportoin, based on hydroxyl radicals present, for the simple reason that at each stage of reaction a hydroxyl is obtained, which, in turn, is susceptible to further oxyalkylation with any alkylene oxide, and of course, with allyl glycidyl ether.

The use of allyl glycidyl ether, as previously noted, involves substantially the same procedure and equipment as glycide. The glass equipment previously described could be used, although I have found it more convenient to employ the larger laboratory autoclave previously described. The use will be illustrated by the following examples.

As to further information in regard to allyl glycidyl ether, see information Sheet DS–48–22 of Shell Development Co., Emeryville, California.

Example 1d

The same piece of equipment was employed as previously described in Part 2, i. e., an autoclave, although in the instant procedure involving the use of allyl glycidyl ether, there was no pressure involved, and certain changes were made as noted subsequently. The autoclave was equipped with a water-cooled condenser which was shut off when used as an autoclave. It was equipped also with a separatory funnel and an equalizing pressure tube so the liquid such as allyl glycidyl ether could be fed continuously at a dropwise or faster rate into the vessel, and the rate was controlled by visual examination. For convenience, this piece of equipment is referred to as an autoclave, because it is essentially designed for such use, but it is to be noted that it is not so used when allyyl glycidyl ether, or for that matter, glycidol was employed, as described in Part 2, preceding.

There were charged into the autoclave 921 grams of a xylene solution (containing 300 grams of xylene) identified as Example 1c, preceding. Such amount of sodium methylate equivalent to about 1% of the hydroxylated reactant was added as a catalyst, which, in this instance, was 6.5 grams. The autoclave was sealed, swept with nitrogen gas and stirring started and heat applied immediately. The temperature was allowed to rise to 123° C. The allyl glycidyl ether employed was the technically pure product supplied by the Shell Development Co., Emeryville, California.

The hydroxylated reactant present in the autoclave represented approximately 3 moles of phenol when calculated back to the initial reactants described in Part 1. The amount of allyl glycidyl ether added was approximately 3 moles or 350 grams. This was added over a 3½ hour period. This was charged into the upper reservoir vessel which had been flushed out previously with nitrogen and was in essence the equivalent of a separatory funnel. The oxide was started slowly into the reaction mass at a dropwise rate. The reaction started immediately and the temperature rose approximately 13° to 19°. Cooling water was run through the coils so the temperature for the addition of the oxide was controlled within the range of 115° to 135° C. The reaction took place at atmospheric pressure with simply a small stream of nitrogen passing into the autoclave at the very top, and passing out of the open condenser so as to avoid any possible entrance of air. Under such operation there was, of course, some loss of xylene, but examination revealed no loss of the oxide.

The product, so obtained, was fluid, lighter in color than the initial example, and on examination, was found to be comparatively free from unreacted oxide. Likewise, examination by determination of the hydroxyl number, showed substantial completeness of reaction. Needless to say, such procedure also increased the water solubility of the product.

What is said in this instance in regard to physical properties applies, for all practical purpose, to all examples obtained. Obviously, where increased amounts of the ether were employed, the final product tended to show more and more the characteristics of a viscous liquid comparable to castor oil or slightly blown castor oil. The color also decreased as more oxide was added.

Example 2d

The same procedure was employed as in Example 1d, preceding, using the same operating procedure and substantially the same temperature range, with this difference: The product subjected to treatment with allyl glycidyl ether was the hydroxylated compound identified as Example 2c, preceding. The amount employed in this instance was 986 grams, including 300 grams of solvent. The amount of sodium methylate used as a catalyst was 7½ grams. In all other respects the operating procedure was identical with the two preceding examples.

Operating data in regard to similar examples are given in the tables immediately following.

Incidentally, it is to be noted that one need not use sodium methylate as a catalyst, but can use any one of a number of other suitable catalysts, such as caustic soda or caustic potash. Stannic chloride or boron fluoride ether complex are also satisfactory.

| Ex. No. | Ex. No. of Alicyclic Compound Used | Amt. of Alicyclic Compound Used (Solvent-free basis), grs. | Solvent | Amt., grs. | Catalyst | Amt., grs. | Amt. AGE, grs. | Molal ratio of AGE to each Mole Phenol Originally present | Max. Temperature ° C. Reaction | Time of Reaction |
|---|---|---|---|---|---|---|---|---|---|---|
| 1d | 1c | 621 | Xylene | 300 | Sodium Methylate | 6.5 | 350 | 1:1 | Not over 138 | 3½ |
| 2d | 2c | 686 | do | 300 | do | 7½ | 350 | 1:1 | do | 2¾ |
| 3d | 3c | 721 | do | 300 | do | 7½ | 350 | 1:1 | do | 2½ |
| 4d | 10c | 789 | do | 300 | do | 8 | 350 | 1:1 | do | 4 |
| 5d | 11c | 854 | do | 300 | do | 9 | 350 | 1:1 | do | 3½ |
| 6d | 12c | 889 | do | 300 | do | 9 | 350 | 1:1 | do | 3½ |
| 7d | 17c | 867 | do | 300 | do | 9 | 350 | 1:1 | do | 3 |
| 8d | 18c | 932 | do | 300 | do | 10 | 350 | 1:1 | do | 2½ |
| 9d | 19c | 967 | do | 300 | do | 10 | 350 | 1:1 | do | 4 |
| 10d | 25c | 957 | do | 300 | do | 10 | 350 | 1:1 | do | 4½ |
| 11d | 26c | 1,022 | do | 300 | do | 10 | 350 | 1:1 | do | 4¾ |
| 12d | 27c | 1,057 | do | 300 | do | 11 | 350 | 1:1 | do | 3¾ |
| 13d | 1c | 621 | do | 300 | do | 7 | 260 | 3:4 | do | 2½ |
| 14d | 2c | 686 | do | 300 | do | 7 | 260 | 3:4 | do | 2¾ |
| 15d | 3c | 721 | do | 300 | do | 7 | 260 | 3:4 | do | 2 |
| 16d | 10c | 789 | do | 300 | do | 8½ | 260 | 3:4 | do | 3 |
| 17d | 11c | 854 | do | 300 | do | 9 | 260 | 3:4 | do | 3½ |
| 18d | 12c | 889 | do | 300 | do | 10 | 260 | 3:4 | do | 4½ |
| 19d | 17c | 867 | do | 300 | do | 9 | 260 | 3:4 | do | 4 |
| 20d | 18c | 932 | do | 300 | do | 9½ | 260 | 3:4 | do | 4½ |
| 21d | 19c | 967 | do | 300 | do | 10 | 260 | 3:4 | do | 3½ |
| 22d | 25c | 957 | do | 300 | do | 10 | 260 | 3:4 | do | 4 |
| 23d | 26c | 1,022 | do | 300 | do | 10 | 260 | 3:4 | do | 4¾ |
| 24d | 27c | 1,057 | do | 300 | do | 11 | 260 | 3:4 | do | 3½ |
| 25d | 37c | 745 | do | 300 | do | 8 | 350 | 1:1 | do | 3½ |
| 26d | 38c | 830 | do | 300 | do | 9½ | 350 | 1:1 | do | 4 |
| 27d | 39c | 875 | do | 300 | do | 9 | 350 | 1:1 | do | 3½ |
| 28d | 49c | 685 | do | 300 | do | 7 | 350 | 1:1 | do | 3 |
| 29d | 50c | 770 | do | 300 | do | 8½ | 350 | 1:1 | do | 3½ |
| 30d | 51c | 815 | do | 300 | do | 8½ | 350 | 1:1 | do | 2½ |

Attention is again directed to the fact that other suitable solvents other than xylene may be used, such as decalin, cymene, etc. Other suitable catalyts can be employed. It is also pointed out that the amount of allyl glycidyl ether employed need be only enough to introduce a plurality of allyl radicals per resin molecule, or may be enough to introduce a number of allyl radicals equal to the original phenolic hydroxyls, or twice as many, or three times as many. My preferred ratio is to use 3 moles of allyl glycidyl ether for each 4 moles of phenol originally used, or to use an equal number of moles, 4 for 4, or else 5 moles of allyl glycidyl ether for each 4 moles of phenol originally used.

Compounds of the kind above described, i. e., polyhydroxylated compounds containing allyl radicals, can be employed in the same manner that various polyhydroxylated compounds, such as glycerol, pentaerythritol, tetramethylolcyclohexanol, or the like are used to form esters having drying properties, that is, by combination with fatty acids obtained from soyabean oil, linseed oil, tung oil, dehydrated castor oil, or the like. Such esters not only give the properties of the usual drying oil esters, but additionally give suitable films for coatings, by virtue of vinyl polymerization which takes place, due to the presence of the allyl groups, which, broadly speaking, are analogues of vinyl radicals, or, in fact, may be considered as the actual equivalent.

However, in addition to these uses, I desire to point out that in my co-pending application Serial No. 177,552, filed August 3, 1950, I have shown that materials of the kind herein described may be subjected to drastic oxidation; and in my co-pending application Serial No. 177,553, filed August 3, 1950, I have shown that such drastically-oxidized materials can be subjected to oxyethylation, particularly with ethylene oxide, to yield surface-active materials which are valuable for many purposes, such as demulsification of water-in-oil emulsions. This last feature is described in my co-pending application Serial No. 177,554, filed August 3, 1950.

Needless to say, the resins herein described can be subjected to reaction with alkylene oxides in the manner described in aforementioned U. S. Patent No. 2,449,370 and employed for the herein described purpose of breaking oil field emulsions.

Having thus described my invention, what I claim as new and desire to secure by Letters Patent is:

1. The process of (a) subjecting an oxyalkylation-susceptible, fusible, organic solvent-soluble, water-insoluble phenolaldehyde resin; said resin being derived by reaction between a difunctional monohydric phenol and an aldehyde having not over 8 carbon atoms and having one functional group reactive toward said phenol; said resin being formed in the substantial absence of phenols of functionality greater than two; said phenol being of the formula

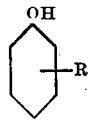

in which R is a hydrocarbon radical having at least 4 and not more than 18 carbon atoms and substituted in one of the positions ortho and para to oxyalkylation with an alpha-beta alkylene oxide having not more than 4 carbon atoms and selected from the class consisting of ethylene oxide, propylene oxide, butylene oxide, glycide and methylglycide; said oxyalkylated resin being characterized by the introduction into the resin molecule at the phenolic hydroxyls of a plurality of divalent radicals having the formula $R_1O$, in which $R_1$ is a member selected from the class consisting of ethylene radicals, propylene radicals, butylene radicals, hydroxypropylene radicals, and hydroxybutylene radicals; with the proviso that from about one-half to less than two moles of alkylene oxide be introduced for each phenolic nucleus; (b) converting said oxyalkylated resin into the corresponding alicyclic compound by hydrogenation in presence of a hydrogenating catalyst; and (c) reacting said hydroaromatic compound with allyl glycidyl ether, with the proviso that at least 2 moles of allyl glycidyl ether be reacted for each alicyclic molecule and not in excess of three times the number of hydroxyl radicals present in said molecule.

2. The process of claim 1, wherein the aldehyde is formaldehyde.

3. The process of claim 1, wherein the aldehyde is formaldehyde and the alkylene oxide is ethylene oxide.

4. The process of claim 1, wherein the aldehyde is formaldehyde and the alkylene oxide is ethylene oxide, with the proviso that the molal ratio of ethylene oxide to initial phenolic hydroxyl be approximately 1 to 1.

5. The process of claim 1, wherein the aldehyde is formaldehyde and the alkylene oxide is ethylene oxide, with the proviso that the molal ratio of ethylene oxide to initial phenolic hydroxyl be approximately 1 to 1, and with the further proviso that the molal ratio of allyl glycidyl ether to the corresponding alicyclic hydroxyl be approximately 1 to 1.

6. The process of claim 1, wherein the aldehyde is formaldehyde and the alkylene oxide is ethylene oxide, with the proviso that the molal ratio of ethylene oxide to initial phenolic hydroxyl be approximately 1 to 1, and with the further proviso that the molal ratio of allyl glycidyl ether to the corresponding alicyclic hydroxyl be approximately 1 to 1; and with the final proviso that the radical R is a butyl radical.

7. The process of claim 1, wherein the aldehyde is formaldehyde and the alkylene oxide is ethylene oxide, with the proviso that the molal ratio of ethylene oxide to initial phenolic hydroxyl be approximately 1 to 1, and with the further proviso that the molal ratio of allyl glycidyl ether to the corresponding alicyclic hydroxyl be approximately 1 to 1; and with the final proviso that the radical R is an amyl radical.

8. The process of claim 1, wherein the aldehyde is formaldehyde and the alkylene oxide is ethylene oxide, with the proviso that the molal ratio of ethylene oxide to initial phenolic hydroxyl be approximately 1 to 1, and with the further proviso that the molal ratio of allyl glycidyl ether to the corresponding alicyclic hydroxyl be approximately 1 to 1; and with the final proviso that the radical R is an octyl radical.

9. The process of claim 1, wherein the aldehyde is formaldehyde and the alkylene oxide is ethylene oxide, with the proviso that the molal ratio of ethylene oxide to initial phenolic hydroxyl be approximately 1 to 1, and with the further proviso that the molal ratio of allyl glycidyl ether to the corresponding alicyclic hydroxyl be approximately 1 to 1; and with the final proviso that the radical R is a nonyl radical.

10. The process of claim 1, wherein the aldehyde is formaldehyde and the alkylene oxide is ethylene oxide, with the proviso that the molal ratio of ethylene oxide to initial phenolic hydroxyl be approximately 1 to 1, and with the further proviso that the molal ratio of allyl glycidyl ether to the corresponding alicyclic hydroxyl be approximately 1 to 1; and with the final proviso that the radical R is a tetradecyl radical.

11. The product obtained by the process defined in claim 1.

12. The product obtained by the process defined in claim 2.

13. The product obtained by the process defined in claim 3.

14. The product obtained by the process defined in claim 4.

15. The product obtained by the process defined in claim 5.

16. The product obtained by the process defined in claim 6.

17. The product obtained by the process defined in claim 7.

18. The product obtained by the process defined in claim 8.

19. The product obtained by the process defined in claim 9.

20. The product obtained by the process defined in claim 10.

MELVIN DE GROOTE.

REFERENCES CITED

The following references are of record in the file of this patent:

UNITED STATES PATENTS

| Number | Name | Date |
| --- | --- | --- |
| 2,528,932 | Wiles | Nov. 7, 1950 |